(12) United States Patent
Rubio et al.

(10) Patent No.: US 8,411,467 B2
(45) Date of Patent: Apr. 2, 2013

(54) ULTRA-LOW VOLTAGE BOOST CIRCUIT

(75) Inventors: Edward Rubio, Santa Teresa, NM (US);
Stanley Simon Hirsh, El Paso, TX (US);
David Charles Nemir, El Paso, TX (US)

(73) Assignee: TXL Group, Inc., El Paso, TX (US)

( * ) Notice: Subject to any disclaimer, the term of this patent is extended or adjusted under 35 U.S.C. 154(b) by 187 days.

(21) Appl. No.: 12/799,222

(22) Filed: Apr. 21, 2010

(65) Prior Publication Data

US 2010/0208498 A1 Aug. 19, 2010

Related U.S. Application Data

(63) Continuation-in-part of application No. 12/333,520, filed on Dec. 12, 2008, now Pat. No. 8,231,240.

(60) Provisional application No. 61/007,319, filed on Dec. 12, 2007, provisional application No. 61/214,778, filed on Apr. 28, 2009.

(51) Int. Cl.
*H02M 3/335* (2006.01)

(52) U.S. Cl. .............................. 363/19; 363/21; 363/49

(58) Field of Classification Search .............. 363/16–20, 363/21.01, 49, 89, 97, 131; 315/224, 291
See application file for complete search history.

(56) References Cited

U.S. PATENT DOCUMENTS

| | | | | |
|---|---|---|---|---|
| 4,095,998 A * | 6/1978 | Hanson | ........................ | 136/208 |
| 4,371,917 A * | 2/1983 | Bator | ........................ | 363/21.08 |
| 4,890,210 A | 12/1989 | Myers | | |
| 5,282,120 A * | 1/1994 | Kijima | ........................ | 363/19 |
| 6,404,990 B2 * | 6/2002 | Isozaki et al. | ........................ | 396/206 |
| 6,548,966 B2 * | 4/2003 | Kawasaka et al. | ........................ | 315/291 |
| 6,597,155 B2 | 7/2003 | Huang et al. | | |
| 7,170,762 B2 | 1/2007 | Chian et al. | | |
| 8,027,176 B2 * | 9/2011 | Nakai | ........................ | 363/21.16 |

OTHER PUBLICATIONS

Texas Instruments, Inc., Data Sheet for TPS61200,TPS61201,TPS61202, "Low Input Voltage Synchronous Boost Converter with 1.3-A Switches", Revision dated Feb. 2008, pp. 1-17.

* cited by examiner

*Primary Examiner* — Vibol Tan

(57) ABSTRACT

A circuit for boosting the voltage from a very low level voltage source to a higher level voltage output utilizing self-oscillation.

7 Claims, 9 Drawing Sheets

ULTRA-LOW VOLTAGE BOOST CIRCUIT

CROSS-REFERENCE TO RELATED APPLICATIONS

This application is a continuation-in-part application of U.S. patent application Ser. No. 12/333,520 entitled "Surface Lighting Devices Having a Thermoelectric Power Source" which was filed on Dec. 12, 2008 now U.S. Pat. No. 8,231,240, and which claims the priority date of U.S. Provisional Patent Application Ser. No. 61/007,319 which was filed on Dec. 12, 2007. This application further claims the priority of U.S. Provisional Patent Application 61/214,778 filed Apr. 28, 2009, which is incorporated by reference as if written herein in its entirety.

BACKGROUND OF THE INVENTION

1. Field of the Invention

This invention relates to an apparatus and method for boosting millivolt level voltages into higher voltages.

2. Background of the Invention

Voltage is a measurement of the electrical potential between two points.

It is the driving force that causes electrical current to flow. Most battery powered electrical devices use one or more series connected electrochemical cells. Such electrochemical cells, when fully charged, generally have an open circuit voltage of between 1.2 and 4.2 volts. There are some devices that, due to size, weight or cost constraints, must operate off a single cell. In such devices, a voltage boost circuit is often used to take the relatively low voltage of a single cell (which might be under 1 volt for a partially discharged cell) and increase the voltage to a higher level that is more favorable for powering electronic circuits. An example is a laser pointer that can work off of a single cell by using a voltage boost circuit that takes the low voltage from a single electrochemical cell and boosts the voltage to the 4 to 5 volts necessary to drive the laser diode. Another example is the voltage boost circuit that is common in cameras to drive a flash lamp. A single cell, or two series connected cells provide a battery voltage of 1-3 volts. This is then boosted electronically to charge a capacitor to over 200 volts. When the flash is activated, the charged capacitor is rapidly discharged through the flash lamp.

Voltage boost integrated circuits that are designed to boost relatively low input voltages are commercially available. One example is the Texas Instruments TPS61200 low voltage synchronous boost converter which is designed to operate from an input voltage as low as 0.3 volts. However, there are circumstances where it is desirable to boost a much lower voltage. An example is the voltage that is produced from a thermoelectric generation device. Such devices are composed of series connected thermoelements. The generated voltage from a thermoelectric device is proportional to the temperature across the device. So, any given thermoelectric generator will output a voltage of zero volts when there is zero temperature difference and will output a small voltage when there is a small temperature difference. As such, a voltage boost circuit that can convert a very low voltage into a more usable higher voltage, has great value in opening the door for thermoelectric generator applications that have not been previously been possible, allowing useful energy extraction from the heat energy flowing through a thermoelectric device, even when it is driven by a relatively low temperature differential.

It is common in the art to construct voltage boost designs using energy storage components, such as capacitors and inductors, as part of the voltage step-up. One or more transistor switches are used to alternatively either deliver power to, or extract power from, an energy storage component in order to boost the output voltage. The drive for these transistor switches is often obtained from an external source as in U.S. Pat. No. 4,890,210 (Myers). However, there is a need to drive these one or more transistor switches without the use of external oscillators. U.S. Pat. No. 6,597,155 B2 (Huang et al) discloses a self-oscillation boost DC/DC converter that purports to operate from voltages lower than 5 volts DC and that uses two NPN type transistors configured so that when one transistor is turned on, the second transistor is turned off. This circuit requires a minimum of two transistors and cannot initiate oscillation for input voltages of less than the base-emitter voltages of the transistor, typically on the order of 0.6 volts. U.S. Pat. No. 7,170,762 B2 (Chian et al) discloses a low voltage DC-DC converter that accepts input voltages in the range of 100 mV to 700 mV and converts this to a higher level DC voltage. The disclosed embodiments draw power from the source only during alternating half cycles and have the further disadvantage of using a capacitor that is used as part of the self-start oscillator, thereby attenuating the voltage on a transistor gate, and preventing oscillation at very low voltages. A resistor in that circuit also serves to dissipate gate energy and attenuate the gate drive voltage. Co-pending application U.S. Ser. No. 12/333,520 (Rubio et al) discloses a circuit topology for boosting very low voltages that is self-starting and utilizes a single transistor.

The present invention uses self-resonance to cause oscillation when an input voltage is present. That input voltage can be as low as 20 millivolts (0.020 volts) or less, depending upon the circuit parameters. By exploiting the unique properties of a single depletion mode junction field effect transistor (JFET), start-up occurs automatically without the requirement for signal attenuating capacitive coupling at the gate. By then using the oscillations of the depletion mode JFET to control the conduction of one or more N-channel MOSFETs, it is possible to boost the electrical current coupled from a voltage source into the primary side of a transformer, resulting in enhanced power transfer to the secondary side of a transformer. By adding an second primary winding that has a reverse winding sense from the first primary winding, and by controlling current flow through this second primary winding using one or more P-channel MOSFETs, it is possible to obtain power draw from the source during all half cycles, resulting in improved efficiency. This is a so-called push/pull configuration. By using two such voltage boost circuits in opposing polarity with respect to the input voltage, a voltage boost circuit may be constructed that accepts either polarity of input voltage and boosts it to a higher level DC output voltage of known polarity.

To summarize, the present invention has the following objects and advantages:
    a) It allows the step-up voltage conversion of an ultra low input voltage into a more usable higher voltage;
    b) It does not require an external input to start or to maintain oscillations;
    c) it requires only a single transistor to initiate and sustain oscillations;
    d) It does not require capacitive coupling into the transistor gate;
    e) It allows practical power extraction from thermoelectric generation elements even when the temperature gradient across those elements is very low;
    f) In some configurations, it can operate in push/pull mode, allowing full wave extraction of energy from the voltage source;

g) It produces an oscillating output that can feed into a voltage multiplier to produce different direct current voltage levels;

h) it may be configured to accept input voltages of either polarity; and i) It is a more efficient energy converter from low voltage to higher voltage that prior art designs.

Other objects and advantages will be apparent from the detailed drawings and description to follow.

LIST OF REFERENCE NUMERALS

1—A thermoelectric generator
10—Electrical conductor
11—Electrical Insulator
12—N type thermoelement
14—P type thermoelement
16—Heat source
18—Heat sink
19—Electrical conductor attaching to load
20—Electrical load
21—Electrical insulator
22—Source
23—Primary side of transformer
24—Transformer
25—Secondary side of transformer
26—Gate resistor
27—Schematic dots indicating winding sense
28—Depletion N channel JFET
29—N-channel enhancement MOSFET
30—Diode
32—Diode
34—Capacitor
36—Capacitor
38—Common
40—Positive output terminal from voltage step up circuit
41—Negative output terminal from voltage step up circuit
42—Node
43—Electrical load
44—Upper winding on secondary
46—Tap on secondary winding
48—Lower winding on secondary
50—Capacitor
52—Diode
54—Capacitor
56—Diode
58—Capacitor
60—Diode
61—Transformer core
62—Node for one side of DC input voltage
63—Wire
64—Node for other side of DC input voltage
65—Connection of primary to secondary
66—Node for output voltage
67—Tapped connection
68—Node for driving gate of transistor(s)
70—Electrical schematic of transformer
71—Extra winding
72—Node for extra winding
74—Node for extra winding
76—P-channel enhancement MOSFET
77—N-channel enhancement MOSFET
78—First primary side of transformer
80—Secondary winding of transformer
81—Secondary winding of transformer
82—Second primary side of transformer
100—Voltage source
102—Node on one side of voltage source
104—Node on other side of voltage source
106—Steering diode
108—Steering diode
110—Steering diode
112—Steering diode
114—Capacitor
116—Capacitor
118—Output node (positive)
120—Output node (negative)
122—Electrical load
124—Node
126—Node
128—Bridge rectifier
130—Output node
132—Output node
138—Capacitor
140—Load

DESCRIPTION OF THE PREFERRED EMBODIMENTS

In the following paragraphs, the present invention will be described in detail through examples and detailed drawings.

Figure 1:
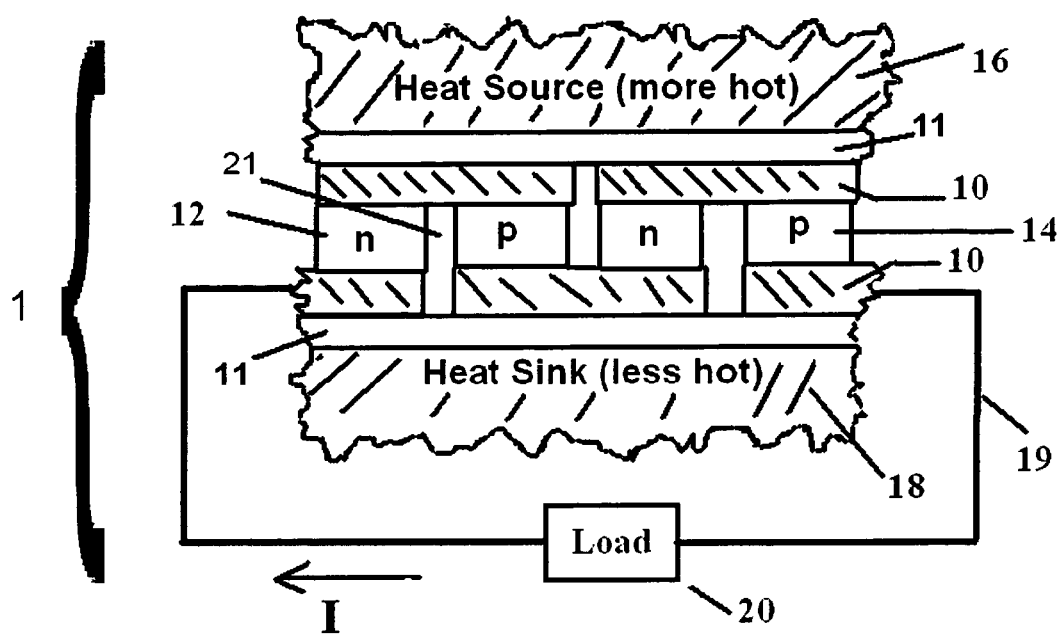
FIG. 1 depicts a thermoelectric voltage generator

FIG. 1 depicts the side view of a thermoelectric generator. The generator is constructed by sandwiching specially chosen N and P type (equivalently n and p type) conductor or semiconductor material 12 and 14 between electrical conductors 10. Although these so-called thermoelements may be built using metals such as bismuth and antimony, higher efficiency thermoelectrics are built using heavily doped semiconductors. The electrical conductors 10 are chosen to be good conductors of both electricity and heat. When fabricated from a semiconductor material, the N type thermoelement 12 is formed by the introduction of a pentavalent chemical compound so that electrons are the majority electricity carrier. When fabricated from a semiconductor material, the P type thermoelement 14 is formed by the introduction of a trivalent chemical compound so that the majority electricity carriers are holes.

The N and P type thermoelectric elements, 12 and 14, are separated from one another by electrical insulator 21. Electrical insulator 21 should also be a poor thermal conductor or it will serve as a heat flow "short circuit". In many embodiments, electrical insulator 21 may simply be implemented by an air or vacuum gap, in which case, the physical separation impedes the transfer of charge carriers between N type thermoelements 12 and P type thermoelements 14. In some embodiments, electrical insulator 21 may be fashioned by using a silica aerogel or by using an organic electrical insulator material with poor heat transfer characteristics such as polyethylene. When the thermoelectric device is placed between a heat source 16 and a heat sink 18, there is a flow of heat energy from the source 16 to the sink 18. Optional electrical insulators 11 serve as a mechanical scaffold that holds the electrical conductors 10 in place. In FIG. 1, the thermoelements are connected in electrical series and thermal parallel. As heat flows from the hotter heat source 16 to the cooler heat sink 18, the charge carriers (electrons for N type material and holes for P type material) flow in the direction of the heat flow. This results in an electrical current, I, which flows through a conductor 19 to an attached electrical load 20. The electrical load 20 can be a resistor or an electronic circuit or a conditioning circuit that modifies the generated power for use with a load that operates at a different voltage and current.

Figure 2:
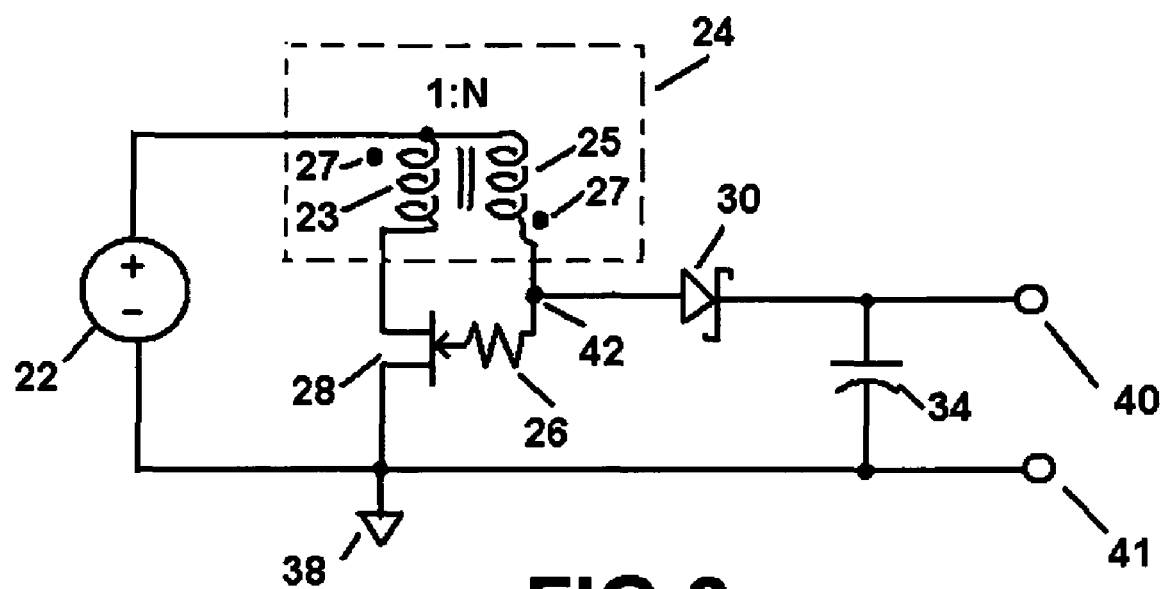
FIG. 2 depicts one embodiment of a self-oscillating voltage step-up circuit for converting low input DC voltages into higher output DC voltage

FIG. 2 depicts an embodiment of the present invention to convert low level voltages from a source 22 into higher DC voltages. Source 22 could be an electrochemical cell. Alternatively, voltage source 22 could be the output from an electronic circuit. Alternatively, voltage source 22 could be a thermoelectric generator that generates electricity from a temperature gradient. Transformer 24 serves to convert the low voltage into higher voltage by using a lower number of turns on the primary side 23 of the transformer 24 relative to the secondary side 25 of the transformer 24. For example, transformer 24 might have a turns ratio on the order of 1:25. One way to accomplish a turns ratio of 1:25 would be to use five windings on the primary side 23 of the transformer 24 and one hundred twenty five windings on the secondary side 25 of the transformer 24. Because the primary side 23 and secondary side 25 are electrically connected together at one point, transformer 24 is equivalent to an electromagnetic device called a tapped inductor. Dots 27 on the transformer diagram indicate the winding sense for the primary side 23 of transformer 24 relative to the secondary side 25 of transformer 24.

An N-type depletion mode junction field effect transistor, or JFET, 28, serves to control oscillations. A depletion mode N-type JFET is chosen because it is initially conducting with zero gate voltage. Noise anywhere in the circuit, that arises for example, from thermal excitation in the JFET 28 or, the capture by transformer 24 of a small amount of energy from the electromagnetic energy that is all around us (from cell phones and other sources) will cause small positive and negative voltage excursions in the transformer secondary 25 that couple into the gate of JFET 28 through gate resistor 26, causing the JFET 28 to change its conductivity. The role of resistor 26 is to provide some isolation between the gate of JFET 28 and node 42, although in some applications, it could be an electrical short (resistance equals zero ohms). When JFET 28 experiences a change in conductivity, it causes a change in the current flow in the primary side 23 of transformer 24. The change in current in the primary side 23 of transformer 24 is then coupled to the secondary side 25 of transformer 24 in a way so as to increase the voltage excursions applied to the gate of JFET 28, and thereby causing fluctuating current at the primary side 23 of transformer 24 as JFET 28 turns on and off. A positive feedback loop is thus created that causes oscillations as JFET 28 is alternately turned on and then off, causing current changes in the primary of transformer 24 which are coupled into the secondary 25 of transformer 24. This causes an oscillating AC voltage at node 42 which, due to the step-up characteristic of the 1:N transformer, is of a much higher magnitude than the voltage magnitude of the source 22. This method of self start-up allows oscillation to occur for extremely low voltage values of voltage source 22. There is no requirement for an external source of excitation and this reduces circuit complexity and eliminates the need for an external power source. When no external power source is needed to "jump-start" oscillations, there is no power lost in that external power source, allowing a higher efficiency voltage conversion.

The cyclically varying voltage at node 42 may be converted to DC voltage by a half wave rectifier comprised by diode 30 and capacitor 34. Diode 30 serves to allow current to pass into capacitor 34 whenever the voltage at node 42 is larger that the sum of the voltage on capacitor 34 and the forward voltage drop on diode 30. Diode 30 also serves to block the discharge of capacitor 34 back through the diode 30 during time intervals when the voltage on capacitor 34 is greater than the voltage at node 42. Diode 30 is preferably chosen to be a Schottky technology diode, synchronous rectifier, or a similar technology having a low forward voltage drop. The capacitor 34 is connected to output nodes 40 and 41. An electrical load may be connected to output nodes 40 and 41. This load could be a resistor, an electronic circuit or one or more series connected electrochemical cells (a battery). If a series connection of electrochemical cells is placed across the output nodes 40 and 41, then the circuit in FIG. 2 functions as a battery charger.

Figure 3:
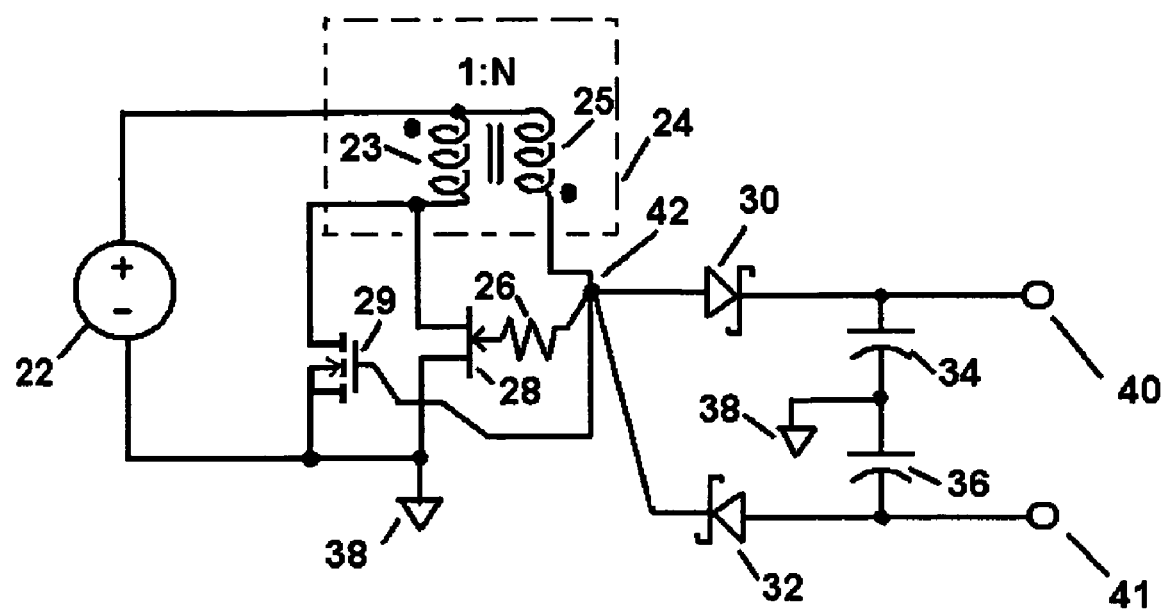
FIG. 3 depicts a second embodiment showing the use of both an N-channel MOSFET current booster and a voltage doubler to increase the level of the DC voltage output

FIG. 3 depicts a second embodiment comprising a voltage step-up circuit having an additional N-channel enhancement metal oxide semiconductor field effect transistor (MOSFET transistor 29). The MOSFET transistor 29 is connected in parallel with JFET 28. That is, the drain leads of both MOSFET 29 and JFET 28 are electrically connected, and the source leads of both MOSFET 29 and JFET 28 are electrically connected. Prior to any oscillation in the circuit, MOSFET 29 is in an off condition and JFET 28 is conducting. Random noise or other influences in the circuit cause fluctuations in the drain to source resistance of JFET 28, which cause changes in the amount of current drawn through the primary 23 of transformer 24, which, through electromagnetic coupling, causes voltage changes in the secondary 25 of transformer 24. The voltage changes in the secondary 25 of transformer 24 cause an oscillation in the conductivity of the JFET 28. Junction Field Effect Transistors such as JFET 28, are known for having a relatively high internal channel resistance even when fully turned on. This is the so-called drain to source resistance when on, or Rds(on). The result is that even when JFET 28 is oscillating from a fully on state to a fully off state, the amount of electrical current that can be drawn through the primary 23 of the transformer 24 is limited, and this poses a limitation on the amount of power that can be transferred electromagnetically from the primary 23 to the secondary 25. However, JFET 28 can turn on and off with a much lower gate voltage than MOSFET 29. When the gate voltage to the MOSFET 29 is at a low level, the circuit responds as though the MOSFET 29 was not even in the circuit. However, when the oscillations due to JFET 28 operation reach a sufficiently high value, it triggers oscillations in the MOSFET 29 and the MOSFET 29 takes over. At that point, the JFET 28 is no longer important for sustaining oscillations and MOSFET 29 governs the oscillations. By choosing a MOSFET with a low Rds(on), there are now higher currents going through the transformer primary 23 than were possible with simply the JFET 28, and consequently, there is much more electromagnetic coupling to the transformer secondary 25. This leads to more efficient operation of the voltage boost and the AC output voltage at node 42 has a higher root mean square value. Although in FIG. 3, JFET 28 is depicted as a single electronic component, multiple junction field effect transistors can be connected in parallel with all source conductors connected electrically, all drain conductors connected electrically, all gate conductors connected electrically, and with the multiple parallel devices acting as a single device 28 with a lower Rds(on) resistance than any single JFET transistor. Similarly, multiple N channel enhancement MOSFETS could be connected in parallel with the multiple devices acting as a single MOSFET device with a lower Rds(on) resistance.

To produce DC voltage, diodes 30 and 32, together with capacitors 34 and 36 serve to rectify the AC voltage at node 42 and to produce a "doubled" DC voltage at output terminals 40 and 41. This type of rectifier circuit is called a voltage doubler. Diodes 30 and 32 are nominally chosen to be Schottky diodes since this type of diode has a relatively low forward voltage drop. The combination of the components 30, 32, 34, 36 is a particular improvement over the simple half wave rectifier in FIG. 2, because power can be drawn from transformer 24 during both half cycles, improving the conversion efficiency, as well as boosting the DC output.

Figure 4:
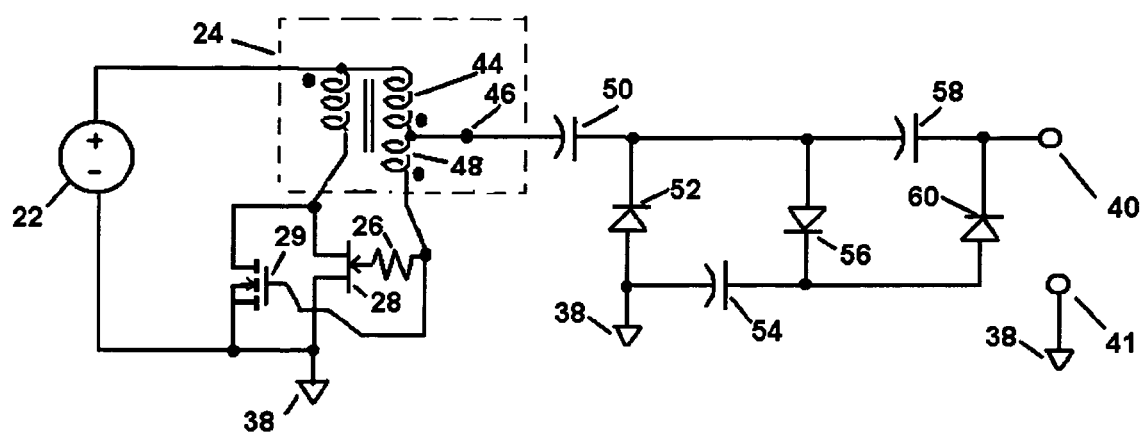
FIG. 4 depicts the use of a tapped secondary to increase gate drive on the transistors and the use of a voltage tripler to boost output DC voltage level

FIG. 4 depicts an embodiment incorporating a voltage boost circuit that makes used of a tapped winding on the secondary of transformer 24. The windings on the secondary of transformer 24 are split into two parts 44, 48 by a tapped connection 46. The advantage is that the full secondary, comprising the series connection of the two parts 44 and 48, represents more windings than just the upper part 44 of the secondary. For this reason, the turns ratio from primary to the full secondary allows higher voltages and this allows oscillation even at low input voltages, since the gate control voltage of JFET 28 and MOSFET 29 is now higher due to the greater turns ratio. The advantage of taking power out at the tap 46 is that the turns ratio from the transformer primary to the upper portion 44 of the secondary is lower and hence more current can be delivered to capacitor 50.

The voltage at the tap 46 is alternating. While this voltage can be rectified by a simple half wave rectifier, or stepped up and rectified by a voltage doubler, FIG. 4 depicts a higher order voltage multiplier that is known as a voltage tripler and is formed by capacitors 50, 54, 58 and diodes 52, 56, 60. The output voltage is taken between node 41 (which is connected to circuit common 38) and node 40 which is connected to the cathode of diode 60. The voltage tripler is one of a class of circuits known as voltage multipliers. By adding additional stages, each stage consisting of a diode and a capacitor, it is possible to build a voltage quadrupler and higher order voltage multipliers.

Figure 5:
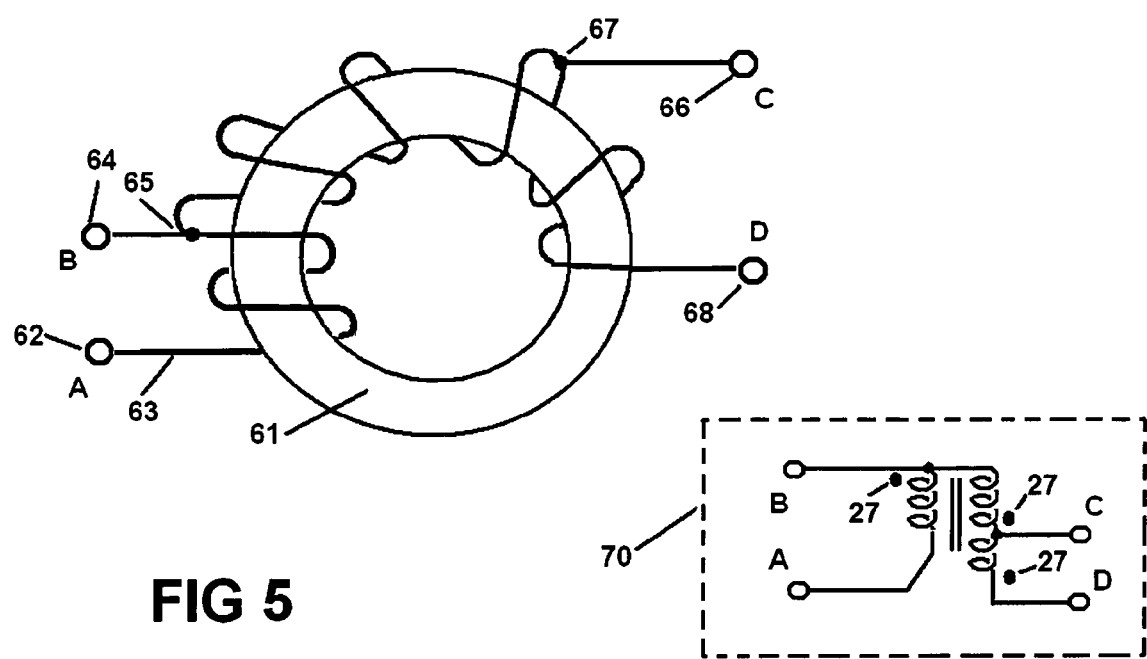
FIG. 5 depicts a transformer that is wound for a boost circuit with a tapped primary winding and a tapped secondary winding

FIG. 5 depicts construction details for a transformer having a tapped secondary. The transformer is wound on a core 61 which is made of a magnetic material that has low magnetic reluctance. A wire 63 is wound around the core 61 for one or more turns. When a changing electrical current is applied to wire 63, it causes a magnetic flux within the core 61. The wire 63 can be wound continuously around the core until it terminates at node 68. Although FIG. 5 depicts a relatively low number of turns (complete loops around the core 61), in practice, there might be hundreds of turns. In an electrical circuit such as the one represented in FIG. 5, nodes 65 and 67 are tap points where other wires can connect to make nodes 64 and 66. Nodes 62 and 64 serve as points where the input voltage is applied. Node 66 is the point at which AC power is extracted when the transformer is used in an oscillatory mode. Node 68 is a point which can be used to drive the gates of the transistors. Schematic 70 illustrates the relationship between the actual transformer and the equivalent electrical connections and also illustrates the way in which the schematic dots 27 indicate winding sense. It should be noted that the numbers of turns on a transformer are arbitrary. One possible choice of turns for the present voltage step-up invention might be five turns between nodes 62 and 65, one hundred turns between nodes 65 and 67, and forty turns between nodes 67 and 68.

Figure 6:
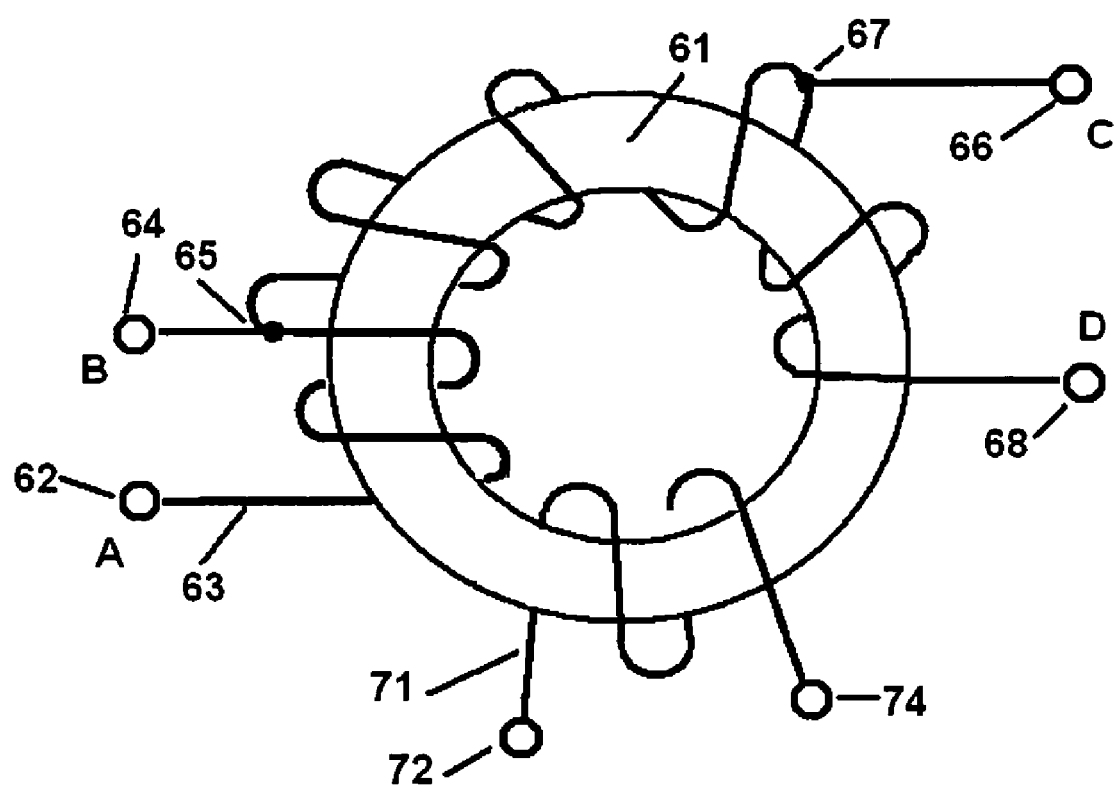
FIG. 6 depicts a transformer with an isolated primary winding of opposite sense

FIG. 6 depicts a voltage step-up transformer wound on a core 61 and having an extra winding 71. Winding 71 is connected with its ends to nodes 72 and 74. If the number of turns between 72 and 74 is the same as the number of turns between 62 and 64, then an alternating voltage applied between nodes 72 and 74 can have the same effect on the voltage between nodes 64 and 68 through electromagnetic coupling as an alternating voltage applied between nodes 62 and 64. The only difference would be the voltage sense and this depends upon the direction of the windings and the phase of the applied voltage. So, from the standpoint of a transformer, nodes 62, 64 could be considered as the input to a first primary and nodes 72, 74 could be considered as the input to a second primary. This is an important point that we will make use of in the discussion relating to FIG. 7.

Figure 7:
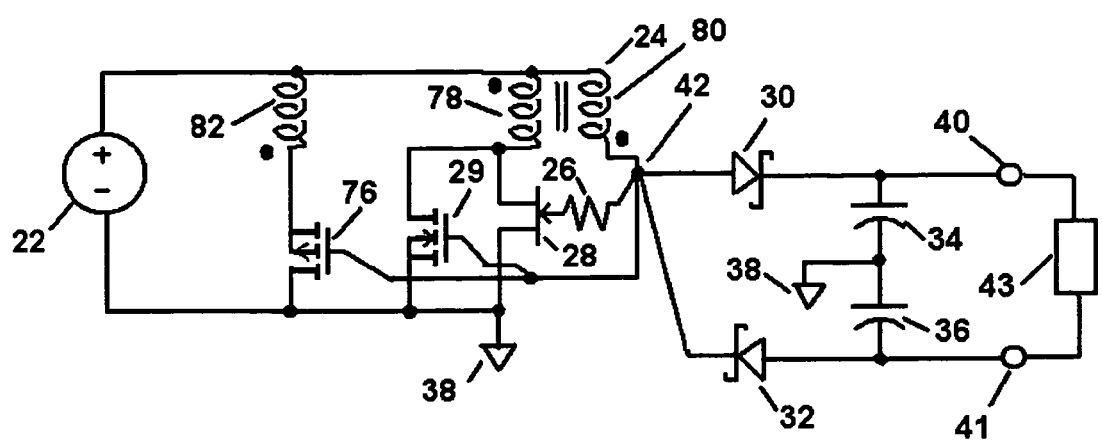
FIG. 7 depicts the use of a P channel MOSFET booster to extract primary current during both positive and negative oscillation half cycles, along with a voltage tripler on the output

FIG. 7 depicts an embodiment of the voltage boost circuit in which a P-channel MOSFET 76 is triggered out of phase with an N-channel MOSFET 29. An AC voltage is produced at node 42 which is then converted to DC using a voltage doubler formed by diodes 30, 32 and capacitors 34, 36.

The circuit in FIG. 7 begins oscillation when noise or other random fluctuations cause JFET 28 to change in conductivity. This causes a change in current in the first transformer primary side 78, which couples electromagnetically into transformer secondary 80 which feeds to the gate of JFET 28, causing a positive feedback loop and creating an oscillation. When the voltage oscillation amplitude at node 42 exceeds the gate turn-on voltage for N-channel MOSFET 29, N-channel MOSFET 29 begins to conduct, causing substantial current flow through the first primary side 78 of the transformer 24. The current causes electromagnetic flux that couples to the transformer secondary 80. After N-channel MOSFET 29 turns fully on, the current flowing in the first primary side 78 of the transformer reaches a maximum. Since the change in flux in the transformer is reduced as the current reaches a maximum, the electromagnet coupling to the transformer secondary 80 causes a reduction in the voltage at node 42. As this voltage goes below the gate turn-off voltage of N-channel MOSFET 29, it caused N-channel MOSFET 29 to turn off. The voltage at node 42 continues to reduce to zero volts and then becomes negative. As the voltage at node 42 becomes sufficiently negative to exceed in magnitude the gate turn-off voltage of P-channel MOSFET 76, then P-channel MOSFET 76 turns on, drawing electrical current through the second primary side 82. This then operates in a similar manner as the N channel MOSFET 29 and first primary side 78, in that power from the voltage source 22 is transferred electromagnetically to the transformer secondary 80. The N and P channel MOSFETs, 29 and 76 respectively, thus function out of phase. When one is active in transferring power to the transformer 24, the other is off, and vice versa. This type of operation is often referred to as push-pull. The result is an increase in power transfer in converting low voltages from the source 22 into higher voltages across nodes 40 and 41 and into a load 43, that is connected across nodes 40 and 41. The reason that there is more power transferred to the load (and hence higher efficiency) is that power is now being drawn from the source during both half cycles of oscillation.

Figure 8:
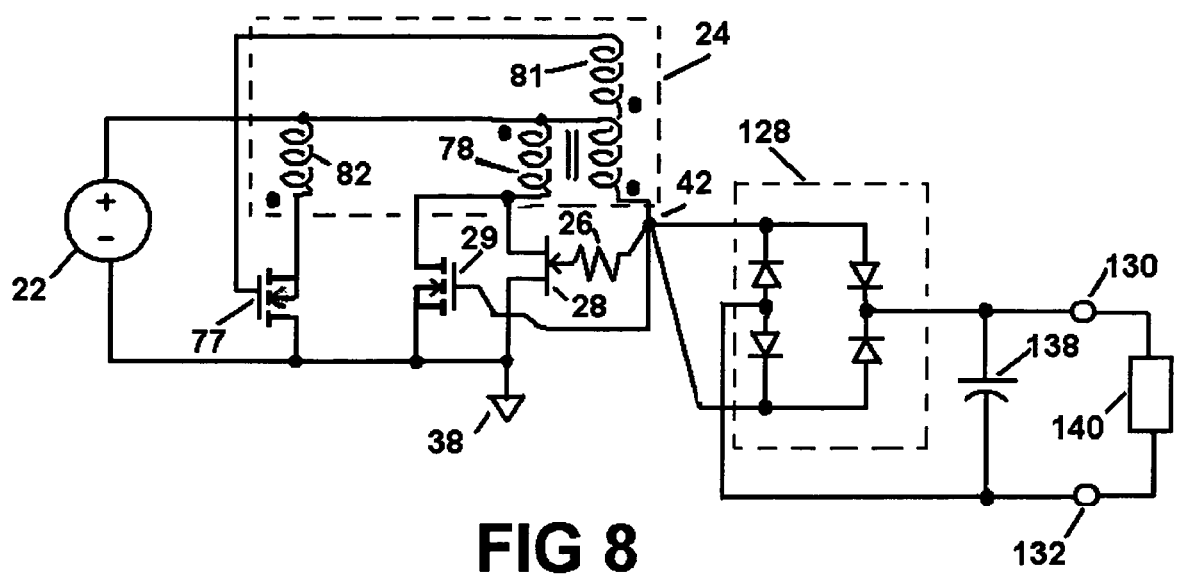
FIG. 8 depicts the use of an N-channel MOSFET booster to extract primary current during both positive and negative half cycles

FIG. 8 depicts an embodiment of the invention that allows current draw from the voltage source during both half cycles of oscillation. As in the FIG. 7 circuit, transformer 24 has two primary windings. Primary winding 82 is connected to primary winding 78, but has an opposite winding sense from primary winding 78. An additional secondary winding 81 serves to provide a voltage signal that is out-of-phase with the voltage at node 42. This secondary winding 81 serves to drive an N-channel MOSFET transistor 77 out-of-phase with N-channel MOSFET transistor 29. The result is that once either N-channel MOSFET begins to cyclically turn on and off, the other N-channel MOSFET will be driven to cyclically turn on and off, but in a manner that is largely out-of-phase with the first N-channel MOSFET. This results in current flow from the source 22 during both half cycles of oscillation. As in previous embodiments, the oscillating output at node 42 must be rectified to produce a DC voltage. In the present embodiment, this is accomplished by using bridge rectifier 128 which provides full wave rectification and allows charge storage on capacitor 138 without discharging back to node 42. The output voltage is available across nodes 130 and 132, to which load 140 may be attached.

Figure 9:
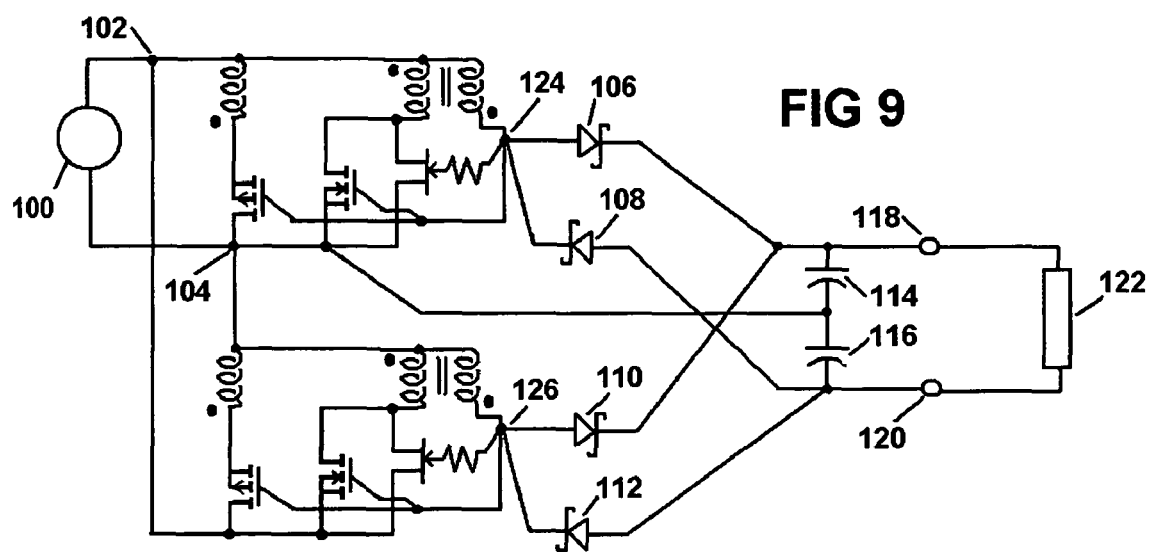
FIG. 9 depicts a circuit that can accept voltage inputs of arbitrary polarity and produce a stepped up DC output.

FIG. 9 depicts an embodiment of the invention that allows the conversion of a low level voltage of any polarity into a higher DC voltage. The FIG. 9 circuit is essentially two independent circuits like that in FIG. 7, that are connected in reverse polarity and that charge capacitors 114 and 116. Voltage source 100 is a voltage source of either polarity or even a periodically changing polarity. The voltage conversion can take place if, relative to node 104, node 102 has a positive value that exceeds some voltage threshold. In this case, the top circuit is active and an AC voltage is induced on node 124. Diodes 106 and 108 serve as components of a voltage doubler comprising diodes 106 and 108 together with capacitors 114 and 116, while diodes 110 and 112 are serve as blocking diodes and do not conduct.

The voltage conversion can also take place if, relative to node 102, node 104 has a positive value that exceeds some voltage threshold. In this case, the bottom circuit is active and an AC voltage is induced on node 126. Diodes 110 and 112 together with capacitors 114 and 115 comprise a voltage doubler. Diodes 106 and 108 serve as blocking diodes and do not conduct.

Regardless of the polarity of the source 100, a load 122 placed across nodes 118 and 120 receives the stepped up voltage with node 118 being more positive than node 120. Load 122 might be a resistor, a rechargeable battery, a sensor, a radio transmitter, or an arbitrary electronic circuit.

The advantage to the circuit in FIG. 9 is that it works with any polarity of voltage source 100. So, for example, if voltage source 100 is created by a thermoelectric generator that converts heat energy to electrical energy, then voltage step-up occurs regardless of whether the temperature gradient is positive or negative. This represents an important feature when generating electrical energy from thermal gradients in the environment. For example, a thermoelectric generator that is powered by the temperature difference between the soil and the air might, during the night, be subjected to warm ground temperatures on one side of the device and cool air temperatures on the other side of the device. During the day, this same thermoelectric generator would be subjected to cool ground temperatures on one side and warm air temperatures on the other side. So the voltage polarity coming off the thermoelectric generator would be positive some of the time and negative some of the time, and in either case, the FIG. 9 circuit could be used to boost and rectify the voltage coming out of the thermoelectric generator to a DC voltage of known polarity and higher magnitude. At any time, the non-active half of the circuit in FIG. 9 will be prevented from oscillation because of negative feedback. The MOSFETs in the nonactive circuit will be turned off, removing their effect on the active circuit.

Although the invention has been described in detail with particular references to these preferred embodiments, other embodiments can achieve the same results. Variations and modifications of the present invention will be obvious to those skilled in the art and it is intended to cover in the appended claims all such modifications and equivalents.

The invention claimed is:

1. An apparatus for converting a low magnitude voltage from a voltage source to a higher magnitude voltage comprising:
   a) a transformer having a high voltage secondary side with a high number of turns, a first low voltage primary side with a low number of turns wound in one direction and a second low voltage primary side with a low number of turns wound in the opposite direction;
   b) one or more N-channel transistors that are in electrical series with said voltage source and said first low voltage primary side of said transformer that controls electrical current flow through said first low voltage primary side of said transformer;
   c) one or more P-channel transistors that are in electrical series with said voltage source and said first low voltage primary side of said transformer that controls electrical current flow through said second low voltage primary side of said transformer;
   d) control lines for said one or more N-channel transistors and said one or more P-channel transistors that are connected through resistors to said high voltage secondary side of said transformer; and
   e) a rectifying circuit that takes a cyclically varying voltage from said high voltage secondary side of said transformer and converts it to a DC voltage;
   whereby the use of two primary side windings allows power to be drawn from said voltage source during positive and negative half cycles of oscillation.

2. The apparatus of claim 1 wherein alternating current flow through said one or more N-channel transistors is initiated by a voltage signal at the gate of said one or more N-channel transistors that arises from noise and electromagnetic excitation in said high voltage secondary side of said transformer, causing self-oscillation.

3. The apparatus of claim 1 wherein alternating current flow through said one or more P-channel transistors is initiated by a voltage signal at the gate of said one or more P-channel transistors that arises from noise and electromagnetic excitation in said high voltage secondary side of said transformer, causing self-oscillation.

4. The apparatus of claim 1 wherein said rectifying circuit also acts as a voltage multiplying circuit.

5. The apparatus of claim 1 wherein said voltage source is a thermoelectric generator.

6. The apparatus of claim 1 wherein said voltage source may have either polarity.

7. The apparatus of claim 1 wherein said voltage source can be a varying voltage.

* * * * *